(12) United States Patent
Joshi et al.

(10) Patent No.: US 8,959,087 B2
(45) Date of Patent: Feb. 17, 2015

(54) SEARCH-BASED UNIVERSAL NAVIGATION

(75) Inventors: Rahul K. Joshi, Aurangabad (IN);
Venkata R. Gujjula, Pleasanton, CA (US); Venkata Veerapaneni, Pleasanton, CA (US); Peijuan Xie, Cupertino, CA (US); Raghu Edalur, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 347 days.

(21) Appl. No.: 13/238,058

(22) Filed: Sep. 21, 2011

(65) Prior Publication Data
US 2013/0073570 A1   Mar. 21, 2013

(51) Int. Cl.
*G06F 17/30* (2006.01)

(52) U.S. Cl.
CPC ............................. *G06F 17/30572* (2013.01)
USPC .......................................................... 707/734

(58) Field of Classification Search
None
See application file for complete search history.

(56) References Cited

U.S. PATENT DOCUMENTS

| | | | |
|---|---|---|---|
| 7,908,288 B2 * | 3/2011 | Nair | 707/769 |
| 8,356,046 B2 * | 1/2013 | Hille-Doering et al. | 707/767 |
| 8,370,362 B2 * | 2/2013 | Szabo | 707/739 |
| 2005/0144158 A1 | 6/2005 | Capper et al. | |
| 2005/0160080 A1 * | 7/2005 | Dawson | 707/3 |
| 2007/0061301 A1 | 3/2007 | Ramer et al. | |
| 2007/0214133 A1 * | 9/2007 | Liberty et al. | 707/5 |
| 2007/0233692 A1 | 10/2007 | Lisa et al. | |
| 2008/0222142 A1 | 9/2008 | O'donnell | |
| 2009/0254546 A1 * | 10/2009 | Madhavan | 707/5 |
| 2010/0049761 A1 * | 2/2010 | Mehta | 707/709 |
| 2010/0153862 A1 * | 6/2010 | Schreiber | 715/760 |
| 2011/0119257 A1 | 5/2011 | Rajasekhar | |
| 2011/0264645 A1 * | 10/2011 | Mital et al. | 707/708 |
| 2012/0323876 A1 * | 12/2012 | Lymberopoulos et al. | 707/706 |

FOREIGN PATENT DOCUMENTS

| | | |
|---|---|---|
| WO | 2007126634 | 11/2007 |
| WO | 2013043994 | 3/2013 |

OTHER PUBLICATIONS

Guo et al. Personalization as a Service: the Architecture and a Case Study, published 2009 ACM.*
Finkelstein et al. Placing Search in Context: The Concept Revisited ACM 2001.*
International Application No. PCT/US2012/056519, International Search Report and Written Opinion mailed on Jan. 9, 2013, 11 pages.

* cited by examiner

*Primary Examiner* — Kevin L Young
(74) *Attorney, Agent, or Firm* — Kilpatrick Townsend & Stockton LLP

(57) ABSTRACT

Embodiments of the invention provide systems and methods for providing a search-based navigation of data across different contexts. According to one embodiment, navigating and accessing data across different contexts can comprise maintaining indexed sets of data related to the different contexts. A user interface can be generated based on a search of the index and presented to a user. The user interface can comprise a view of a current context and a search element for receiving a set of user defined search criteria. The user defined search criteria can be received through the search element of the user interface and the contexts can be searched using the index and based on the search criteria. An updated user interface for presenting the search results be generated and presented to the user. The updated user interface can comprise a representation of the results of the searching and the search element.

14 Claims, 10 Drawing Sheets

FIG. 7B

SEARCH-BASED UNIVERSAL NAVIGATION

BACKGROUND OF THE INVENTION

Embodiments of the present invention relate generally to methods and systems for navigating data contents and more particularly to a search-based navigation of data across different contexts.

Software applications have come to rely heavily on a paradigm for navigating the data and functions of that application that is largely based on a set of menus. For example, enterprise applications provide a menu-based approach to help users navigate to their transaction. Depending on the user's role, the user has to go through a series of clicks using folders and sub-folders available to him to get to the transaction's search page. A search initiated at that point will return possible results for the user to review and drill down to its detail.

However, this approach takes away users productivity by demanding series of clicks just to get to the transaction and requiring user to know his way through the menu structure. Often users in an enterprise application need to take several actions as part of their daily business tasks. These actions are related and potentially tied to a base transaction. Each such action requires user to go to the base transaction and then navigate to the transaction tied to that related action linked from there, i.e., it's a multi-hop process to get to the related action transaction for the user just to get to the page they are interested in. One of the other issues users have to deal with it is ability to work with search and search results. When a user drills down to a transaction from search results page, he may have the need to initiate a new search against the same business component which requires him to go back to search page by leaving his current context which is undesirable from a user experience perspective. Hence, there is a need for improved methods and systems for navigating data contents.

BRIEF SUMMARY OF THE INVENTION

Embodiments of the invention provide systems and methods for providing a search-based navigation of data across different contexts. According to one embodiment, a method for navigating and accessing data across a plurality of different contexts can comprise maintaining sets of data related to a plurality of different contexts. Each set of data can be indexed and searchable through the index. A user interface for navigating across the plurality of different contexts can be generated based on a search of the index and presented to a user. The user interface can comprise a view of a current context of the plurality of different contexts and a search element for receiving a set of user defined search criteria for the search. For example, the search element can include a list of categories for selecting a context of the plurality of context for conducting the search. The list of categories can be determined dynamically based on the current context of the user interface.

A set of user defined search criteria can be received through the search element of the user interface and the sets of data of the plurality of different contexts can be searched using the index and based on the user defined search criteria. An updated user interface for presenting the results of the searching can be generated and presented to the user. The updated user interface can comprise a representation of the results of the searching and the search element. In some cases, the updated user interface can include a list of related actions for each result. In such cases, the related actions for a result can be presented in a hover layer upon selection of that result. The related actions for a result can determined dynamically based on the result, a role of the user, and/or a set of permissions for the user. Additionally or alternatively, the updated user interface can include a set of filters for application to the results. In such cases, the set of filters can be determined dynamically based on the current context. A user selection of one of the filters of the set of filters can be received through the user interface and applied to the results.

According to another embodiment, a system can comprise a processor and a memory communicatively coupled with and readable by the processor. The memory can have stored thereon a sequence of instructions which, when executed by the processor, can cause the processor to maintain sets of data related to a plurality of different contexts. Each set of data can be indexed and searchable through the index. A user interface for navigating across the plurality of different contexts can be generated based on a search of the index and presented to a user. The user interface can comprise a view of a current context of the plurality of different contexts and a search element for receiving a set of user defined search criteria for the search. For example, the search element can include a list of categories for selecting a context of the plurality of context for conducting the search. The list of categories can be determined dynamically based on the current context of the user interface.

A set of user defined search criteria can be received through the search element of the user interface and the sets of data of the plurality of different contexts can be searched using the index and based on the user defined search criteria. An updated user interface for presenting the results of the searching can be generated and presented to the user. The updated user interface can comprise a representation of the results of the searching and the search element. In some cases, the updated user interface can include a list of related actions for each result. In such cases, the related actions for a result can be presented in a hover layer upon selection of that result. The related actions for a result can determined dynamically based on the result, a role of the user, and/or a set of permissions for the user. Additionally or alternatively, the updated user interface can include a set of filters for application to the results. In such cases, the set of filters can be determined dynamically based on the current context. A user selection of one of the filters of the set of filters can be received through the user interface and applied to the results.

According to yet another embodiment, a computer-readable medium can have stored thereon a sequence of instructions which, when executed by a processor, can cause the processor to provide a user interface for navigating and accessing data across a plurality of different contexts by maintaining sets of data related to a plurality of different contexts. Each set of data can be indexed and searchable through the index. A user interface for navigating across the plurality of different contexts can be generated based on a search of the index and presented to a user. The user interface can comprise a view of a current context of the plurality of different contexts and a search element for receiving a set of user defined search criteria for the search. For example, the search element can include a list of categories for selecting a context of the plurality of context for conducting the search. The list of categories can be determined dynamically based on the current context of the user interface.

A set of user defined search criteria can be received through the search element of the user interface and the sets of data of the plurality of different contexts can be searched using the index and based on the user defined search criteria. An updated user interface for presenting the results of the searching can be generated and presented to the user. The updated user interface can comprise a representation of the results of the searching and the search element. In some cases, the updated user interface can include a list of related actions for each result. In such cases, the related actions for a result can be presented in a hover layer upon selection of that result. The related actions for a result can determined dynamically based on the result, a role of the user, and/or a set of permissions for the user. Additionally or alternatively, the updated user interface can include a set of filters for application to the results. In such cases, the set of filters can be determined dynamically based on the current context. A user selection of one of the filters of the set of filters can be received through the user interface and applied to the results.

BRIEF DESCRIPTION OF THE DRAWINGS

FIGS. 7A-7C are screenshots illustrating exemplary user interfaces for presenting category-based filters according to one embodiment of the present invention.

DETAILED DESCRIPTION OF THE INVENTION

Figure 1:
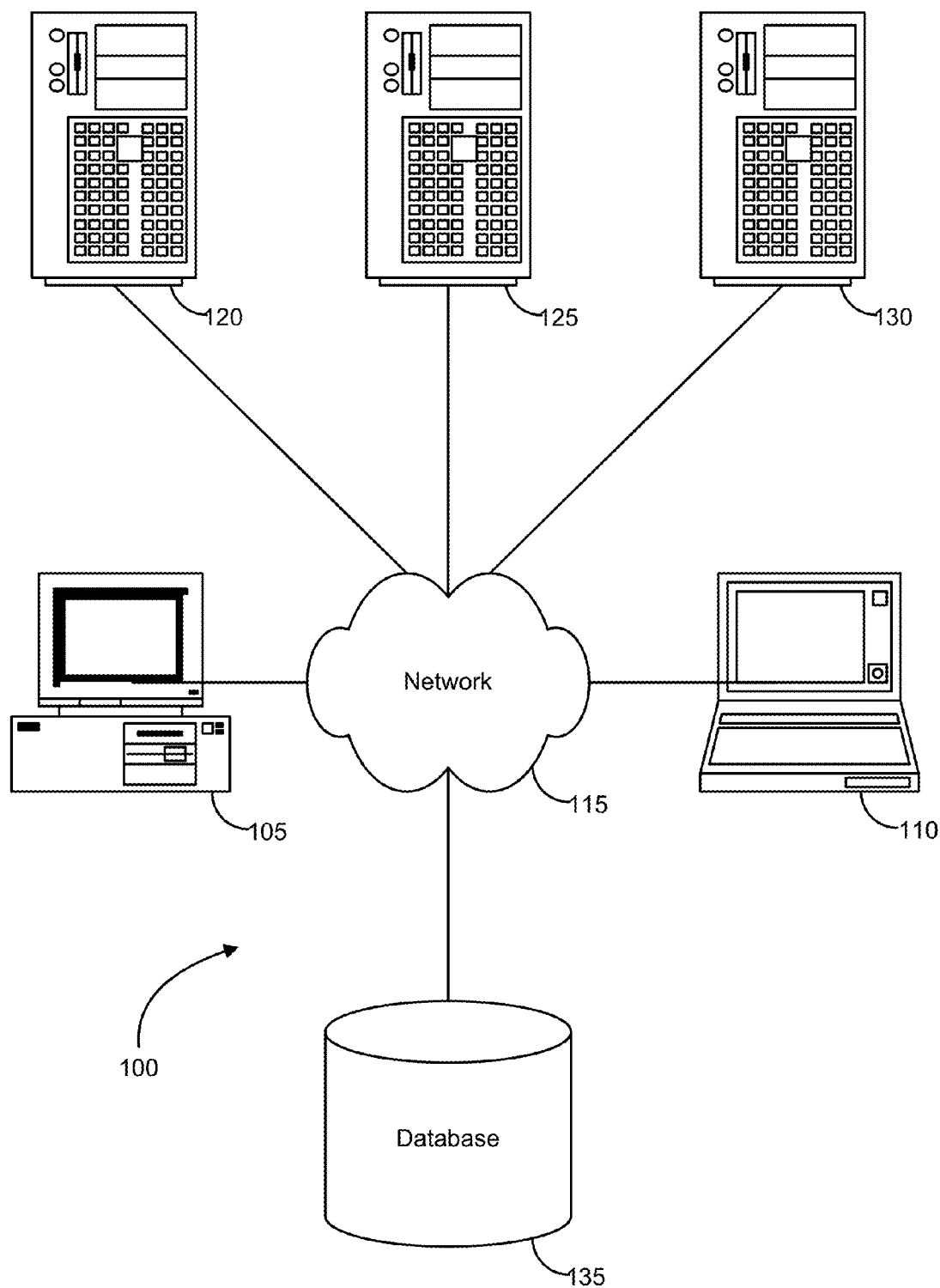
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing a search-based navigation of data across different contexts. More specifically, embodiments of the present invention provide for an application search element that is available to a user when signed into an application. A keyword search from the application search element returns a set of matching results from which the user can navigate directly to the transaction. When in a given transaction, if a user decides to do another search, the user can enter new keywords in the application search bar that is available to him through the user interface of the application. Based on the user's current context, the application search can be limited to that context or may search across multiple contexts.

Embodiments of the present invention address problems around user productivity and user experience when using an application such as an enterprise application by proposing a framework which strives to reduce or eliminate the use of menus for navigating data and/or functions of the application. Embodiments also provide a way for users to take related actions tied to a transaction identified as a result of the search without requiring the user to first open the base transaction and then navigate to the related one. Embodiments of the present invention provide an approach for users to do a new search and review the results thereof before leaving their current page/transaction thereby maintaining their current context. In this way, the user is not required to know his way through the application menu but can rely on a persistently available search element, for example presented in a portal interface of the application, that can be used at any time to search for, navigate to, or take other actions related to, the returned results. In addition, embodiments of the present invention allow a search to span across multiple content repositories, applications, and/or other contexts and give the user matching results from each. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
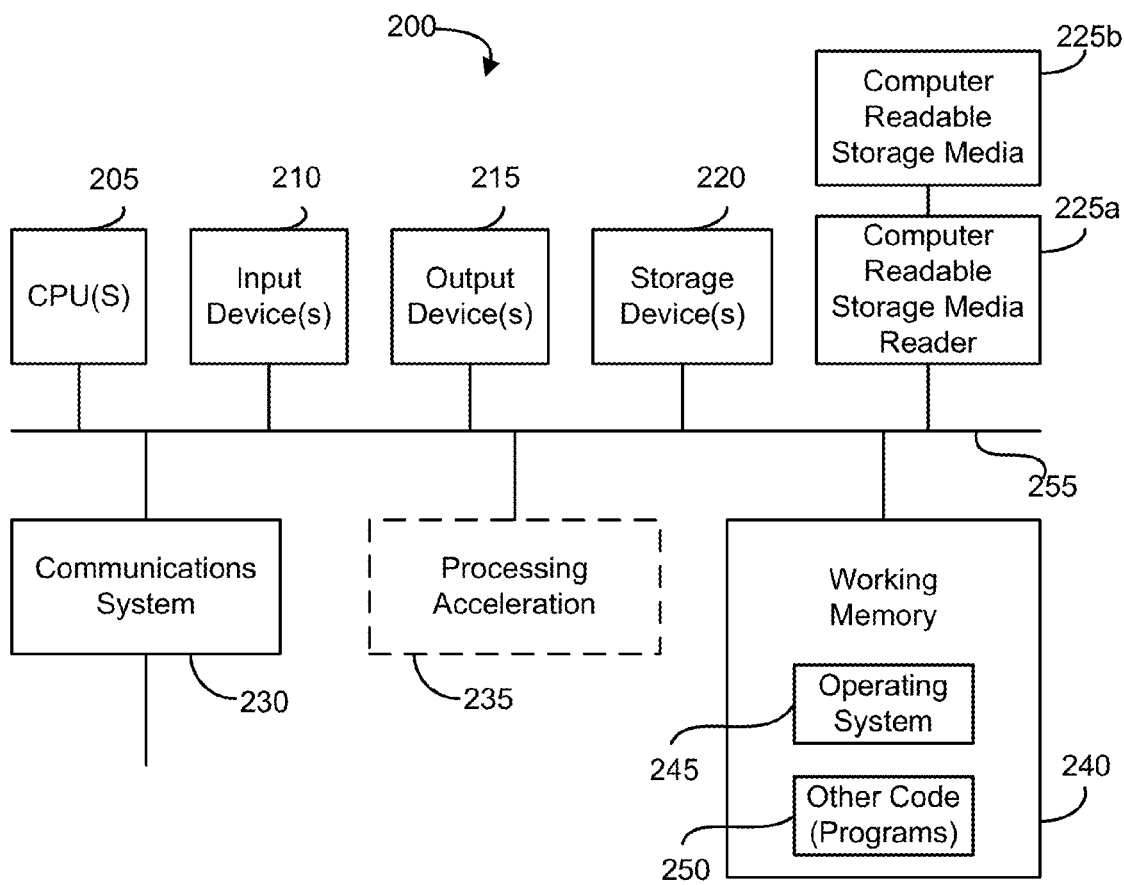
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
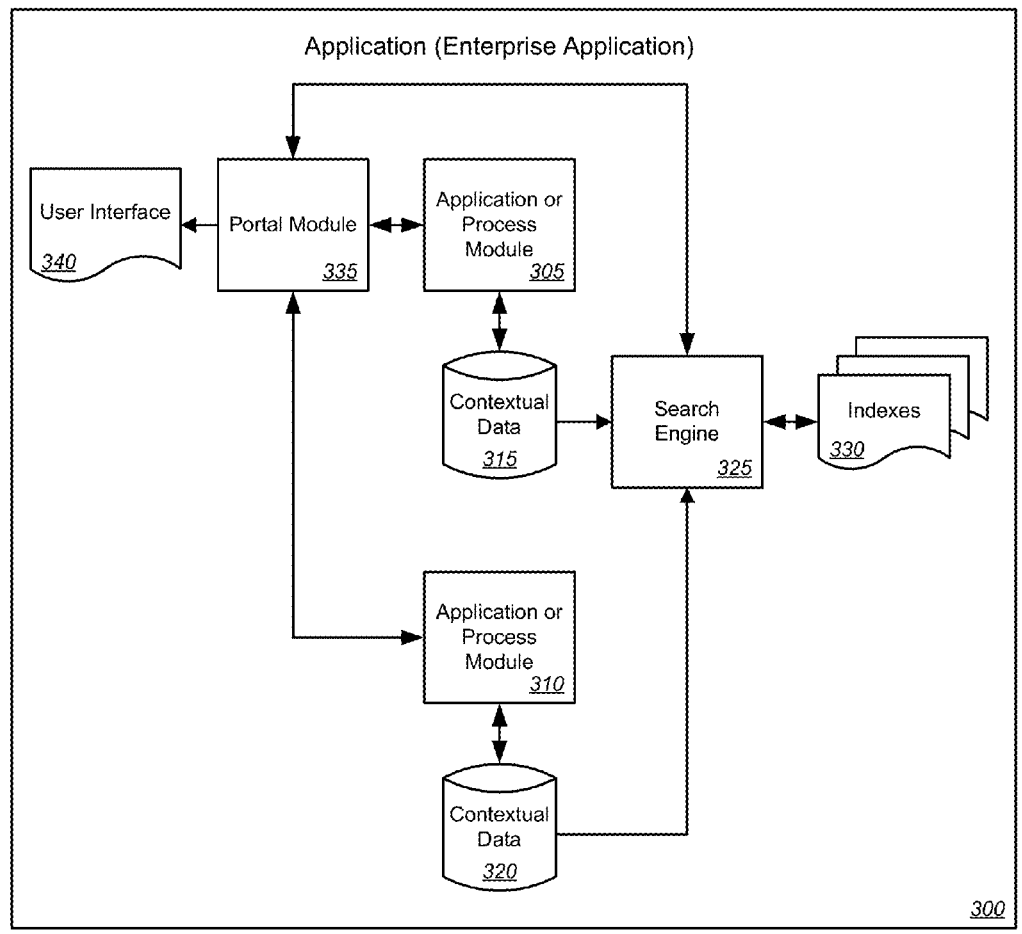
FIG. 3 is a block diagram illustrating, at a high-level, functional components of a system for search-based navigation across different contexts according to one embodiment of the present invention.

FIG. 3 is a block diagram illustrating, at a high-level, functional components of a system for search-based navigation across different contexts according to one embodiment of the present invention. In this example, the system includes an application 300, such as an enterprise application executing on a server or other computer system as described above. As noted above, embodiments of the present invention may be implemented in an enterprise application in which a user may participate in any number of ongoing transaction or other processes. However, even though embodiments described herein are described in the context of such an enterprise application, it should be understood that embodiments of the present invention are not limited to use with such applications. Rather, embodiments of the present invention are thought to be equally applicable and useful with any application to which context is relevant. An enterprise application is given as one example of such an application 300 since it utilizes various business objects and functions that are illustrative of different contexts.

For example, the application 300 can include a number of other process modules 305 and 310 for performing different processes or tasks. It should be understood that, while only two process modules 305 and 310 are illustrated here for the sake of simplicity, any number of process modules 305 and 310 may be implemented. In the context of an enterprise application, these process modules 305 and 310 can include, but are not limited to, a Customer Relation Management (CRM) module, a project management module, a procurement module, a Human Resources (HR) module, a financials and/or accounting module, etc. Each process module 305 and 310 can maintain and/or access records of contextual data 315 and 320, i.e., data related to the context of that particular process, that can be stored in one or more repositories. For example, a CRM module may maintain sets of customer records, a procurement module may maintain data related to procurement transactions such as Requests for Quotes (RFQs), Requests for Proposals (RFPs), etc., a financials module may maintain sets of financials and/or accounting records, etc.

The application 300 may also include or utilize a search engine 325. That is, while illustrated here as part of the application 300, the search engine 325 may, depending upon the implementation, be implemented external to the application 300 and/or the system upon which the application 300 executes. For example, the search engine 325 may be implemented as a web service accessible by the application 300 over the Internet or other communications network. The search engine 325 can access the contextual data 315 and 320 of the process modules 305 and 320. Additionally, the search engine can generate one or more indexes 330 of the contextual data 315 and 320. Using these indexes 330, the search engine 325 can perform any number of keyword and/or attribute searches of the contextual data 315 and 320. Additionally or alternatively, the search engine 325 may perform keyword and/or attribute searches or other queries directly on the contextual data 315 and 320, i.e., rather than through or based on the indexes 330.

The application 300 can also include or utilize a portal module 335 through which users can access and interact with the application 300 and various other components such as the process modules 305 and 320 and search engine 325. As with the search engine 325, it should be understood that, while illustrated here as part of the application 300, the portal module 335 may, depending upon the implementation, be implemented external to the application 300. Regardless of the exact implementation, the portal module 335 may generate and provide a user interface 340 such as, for example, a set of web pages through which may be displayed information, e.g., contextual data 315 and 320 from the process modules 305 and 310 and search results from the search engine 325, and through which the user may input information and/or control operation of the components such as the process modules 305 and 310 and/or search engine 325.

According to one embodiment of the present invention, the user interface 340 presented by the portal module 335 can include an application search element that is available to a user when signed into an application. A keyword search can be performed by the search engine 325 based on criteria provided from the user through this application search element of the user interface 340. The search engine 325 can return through the portal module 335 and user interface 340 a set of matching results, e.g., a list of hyperlinks identifying records of contextual data 315 and 320 from the different process modules 305 and 310 that is found to match the user provided search criteria based on a keyword search of the indexes 330 by the search engine 325. From such a list or other presentation of search results, the user can navigate to the contextual data, initiate some action, etc.

Therefore, users can navigate using the search element of the user interface 340 instead of or in addition to the traditional menus. As noted, embodiments also provide an approach for users to do a new search and review the results thereof before leaving their current page/transaction thereby maintaining their current context. In this way, the user is not required to know his way through the application menu but can rely on a persistently available search element presented in the user interface 340 by the portal module 335. This element can be used at any time to search for, navigate to, or take other actions related to, the returned results. In addition, embodiments of the present invention allow a search to span across multiple repositories of contextual data 315 and 320, processes 305 and 310, other applications (not shown here), and/or other contexts and give the user matching results from each.

Stated another way, a system can maintain sets of data 315 and 320 related to a plurality of different contexts, e.g., different processes 305 and 320, etc. Each set of data 315 and 320 can be indexed by the search engine 325 so that the contextual data 315 and 320 is searchable by the search engine 325 through the indexes 330. A user of the application 300 can navigate and access data across the different contexts through the user interface 340 based on a search of the indexes 330 by the search engine 325. As will be described below with reference to FIG. 4, the user interface 340 can comprise a view of a current context of the plurality of different contexts, i.e., the different contextual data 315 and 320 of process modules 305 and 310, and a search element for receiving a set of user defined search criteria for the search. As also will be described below with reference to FIGS. 6A and 6B, the search element can include a list of categories for selecting a context of the plurality of context for conducting the search. In some cases, the list of categories can be determined dynamically based on the current context of the user interface.

A set of user defined search criteria can be received by the search engine 325 through the search element of the user interface 340. A search can be performed by the search engine 325 on the sets of data 315 and 320 of the plurality of different contexts using the indexes 330 and based on the user defined search criteria. An updated user interface 340 can be generated for presenting the results of the search. The updated user interface 340 can comprise a representation of the results of the search and the search element. According to one embodiment, such as will be described below with reference to FIG. 5, the updated user interface 340 can also include a list of related actions for each result. As illustrated and described in that example, the related actions for a result can be presented in a hover layer upon selection of that result. Such related actions for a result can be determined dynamically by the portal module 335 based on the result, a role of the user, a set of permissions for the user, etc. According to one embodiment, such as will be described below with reference to FIGS. 7A-7C, the updated user interface 340 can additionally or alternatively, include a set of filters for application to the results. In such cases, the set of filters can be determined dynamically by the portal module 335 based on the current context.

The updated user interface 340 can be present to the user by the portal module 335. That is, the updated user interface 340 with the list of search results can be displayed. Through the updated user interface 340, the user may take any of a variety of further actions. For example, using the still available search element, the user may initiate another, new search across multiple contexts of the application. In another example, the user can selected, e.g., click, one of the returned results to display a set of related actions one of which can in turn be selected to initiate that action. In yet another example, the user may select a filter presented with the returned search results. In such a case, a user selection of one of the filters of the set of filters can be received and applied to the results. In this way, the user can navigate the data, transactions, and/or functions of and/or related to an application such as an enterprise application using a persistently available search element of the user interface without needing to resort to navigating the menus of that application. Additionally, the searches initiated in this way can be applied across the different contexts of the application and/or the data of that application without a need to navigate away from a current context thereof.

To further illustrate these processes, a set of exemplary user interfaces are provided and described below. However, it should be understood that the interfaces illustrated and described here are offered only by way of example and are not intended to limit the scope of the present invention. Rather, depending upon the exact implementation, the contents and format of the user interfaces can vary significantly without departing from the scope of the present invention.

Figure 4:
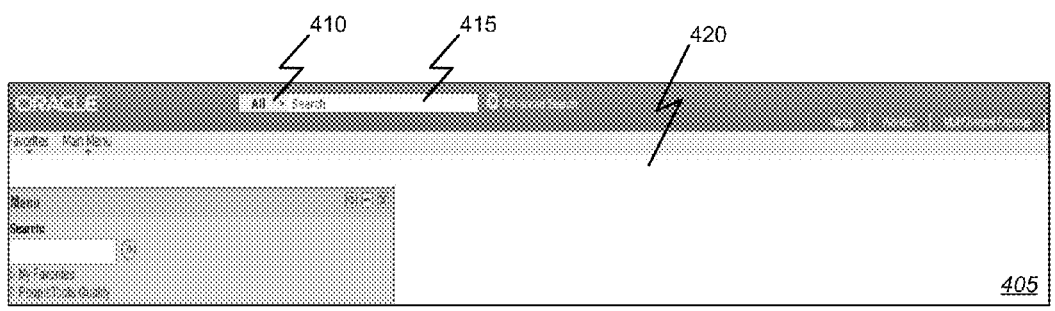
FIG. 4 is a screenshot illustrating an exemplary user interface for presenting and performing search-based navigation of data across different contexts according to one embodiment of the present invention.

FIG. 4 is a screenshot illustrating an exemplary user interface for presenting and performing search-based navigation of data across different contexts according to one embodiment of the present invention. This example illustrates a page 405 of a portal user interface as introduced above. This page 405 can include a portion 420 in which a current context can be presented, e.g., a view of a current transaction etc. The page 405 can also include an application search bar 410 and 415 that is available to user at all times when signed into application. As illustrated in this example, the search bar 410 and 415 can include a choice list 410 or drop-down box for selecting a context to be searched and a textbox or other field for entering the keywords or other criteria for the search.

A search from the application search bar 410 and 415 return a set of matching results from where user can navigate directly to the details of the transaction for that result. The user can initiate a search across all contexts available to the portal he is signed into from the search bar 410 and 415 at the top. In this way, the user is not required to know his way through the application menu. Rather, the user can navigate across data and functions of different contexts of the application using a single search function that spans across multiple content repositories, functions, applications, etc. and gives the user matching results from each.

Figure 5:
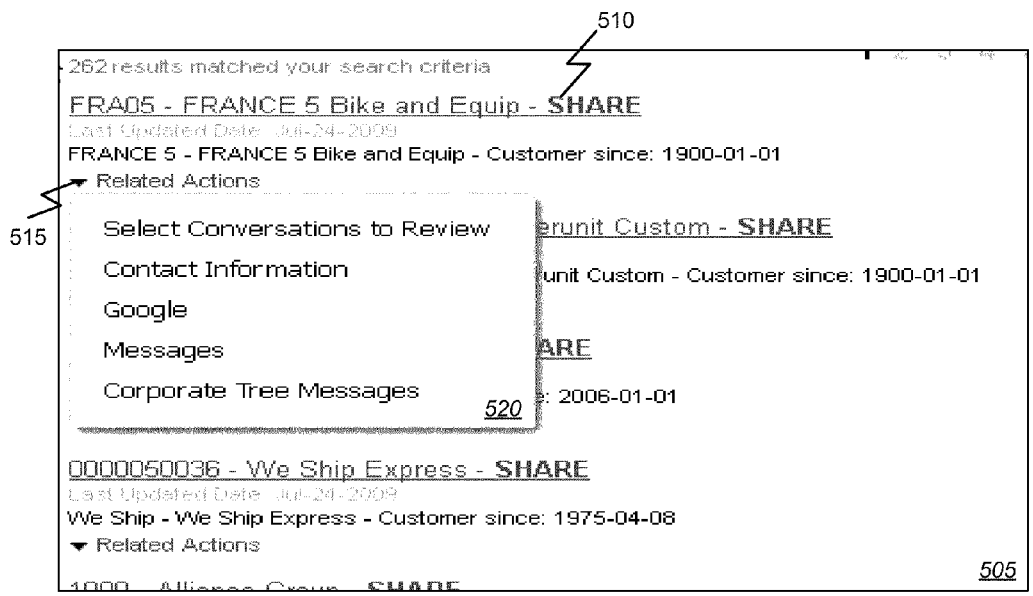
FIG. 5 is a screenshot illustrating an exemplary user interface for presenting related actions for search results according to one embodiment of the present invention.

FIG. 5 is a screenshot illustrating an exemplary user interface for presenting related actions for search results according to one embodiment of the present invention. This example illustrates an example of a page 505 in which search results can be displayed. Here, records 510 of contextual data can be listed, e.g., as hyperlinks, for those records found to match the user provided search criteria. According to one embodiment, the updated page 505 can also include a link 515 or button or other element for displaying a list 520 of related actions for each result. For example, the list 515 of related actions for a selected result can be presented in a hover layer upon selection of that result, e.g., upon clicking the link 515 or other control. Such related actions for a result can be determined dynamically by the portal module based on the result, a role of the user, a set of permissions for the user, etc.

According to one embodiment, these related actions 520 can comprise links or other controls for initiating the action identified. In this way, related actions can be performed directly from the search results page. So for example, a manager looking at search results of user profiles which lists his reports in this organization can take actions like updating his performance appraisal, changing his job code or doing a transfer to another department. Each of these actions can take the user directly to the transaction tied to the employee's profile he is interested in. It eliminates the step to open the employee's user profile transaction and then go his performance appraisal linked from there. To further illustrate, consider an example where a manager is looking at his employee's profile and decides he wants to find out other users in his organization that have similar expertise. A search from application search bar in this case defaults the scope of search to user profiles across the organization. The new results show up in a pop up for the manager in this case to review. The user at that point can choose to dismiss the result or drill down to go to one of the transactions returned by this new search. Thus, the use need not leave the current context to initiate a new search, but rather, can review the new search results in a separate pop up window before deciding whether to go to a new transaction.

Figure 6A:
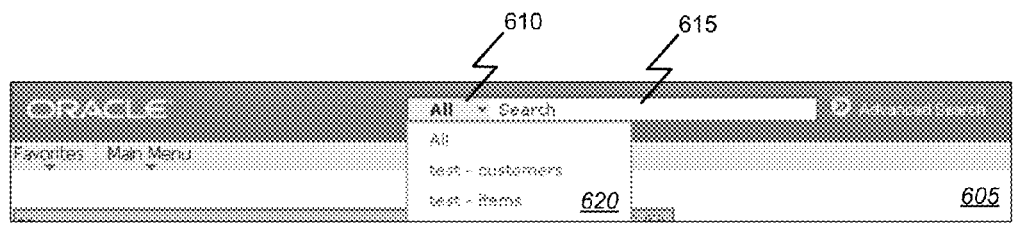
FIGS. 6A and 6B are screenshots illustrating exemplary user interfaces for presenting context-based search categories according to one embodiment of the present invention.
Figure 6B:
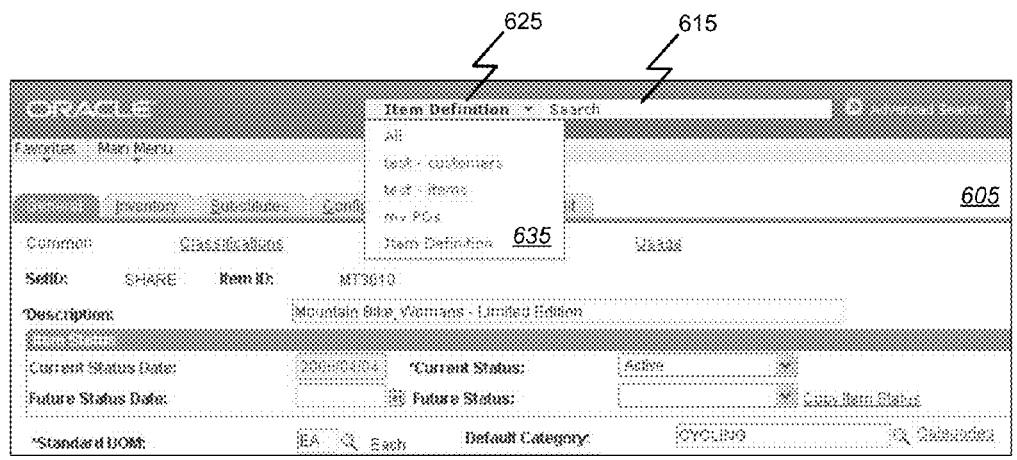

FIGS. 6A and 6B are screenshots illustrating exemplary user interfaces for presenting context-based search categories according to one embodiment of the present invention. This example illustrates a portal page 605 and search bar 610 and 615 such as described above with reference to FIG. 4. As noted above, in addition to defaulting to a specific context, search categories shown in the search bar 610 and 615 can be context sensitive. For example, if a user is looking at a expense report transaction from a financial application, the search categories shown can be related to expense reports or otherwise tied to the financial application. Similarly if viewing an HR related transaction, the search category list can be update accordingly. Thus, FIG. 6A illustrates a choice list 620 including categories for one context, e.g., available search categories when the user is on a home page, while FIG. 6B illustrates the choice list 635 for a different context, e.g., on another transaction page and accordingly with new categories on the list.

Figure 7A:
Figure 7B:
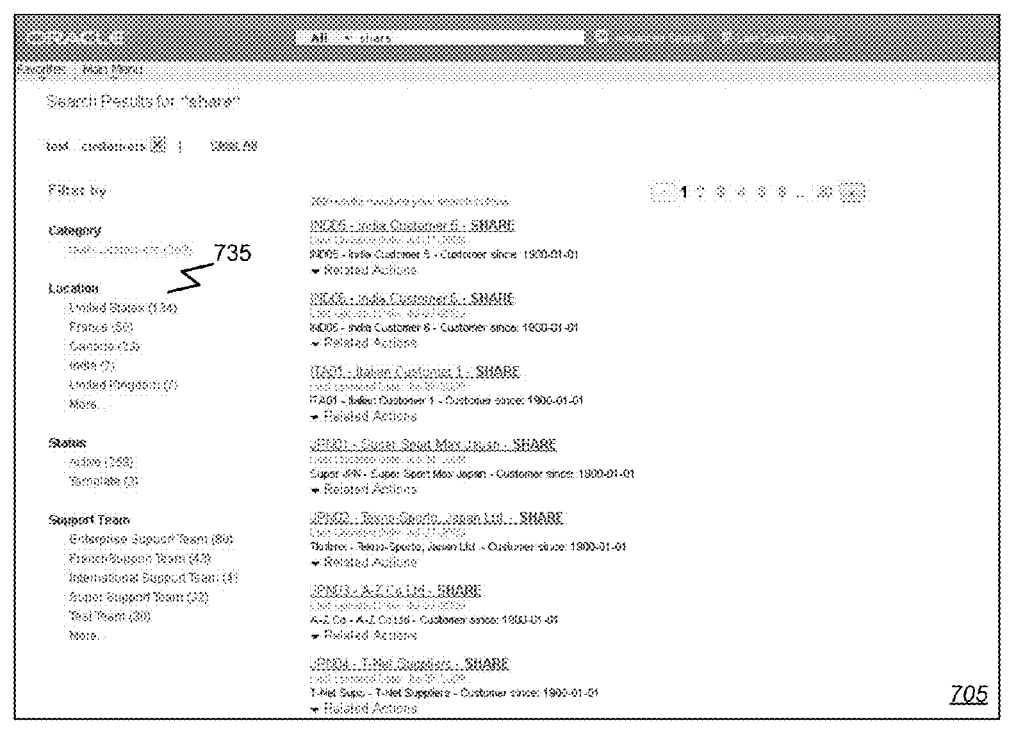
Figure 7C:
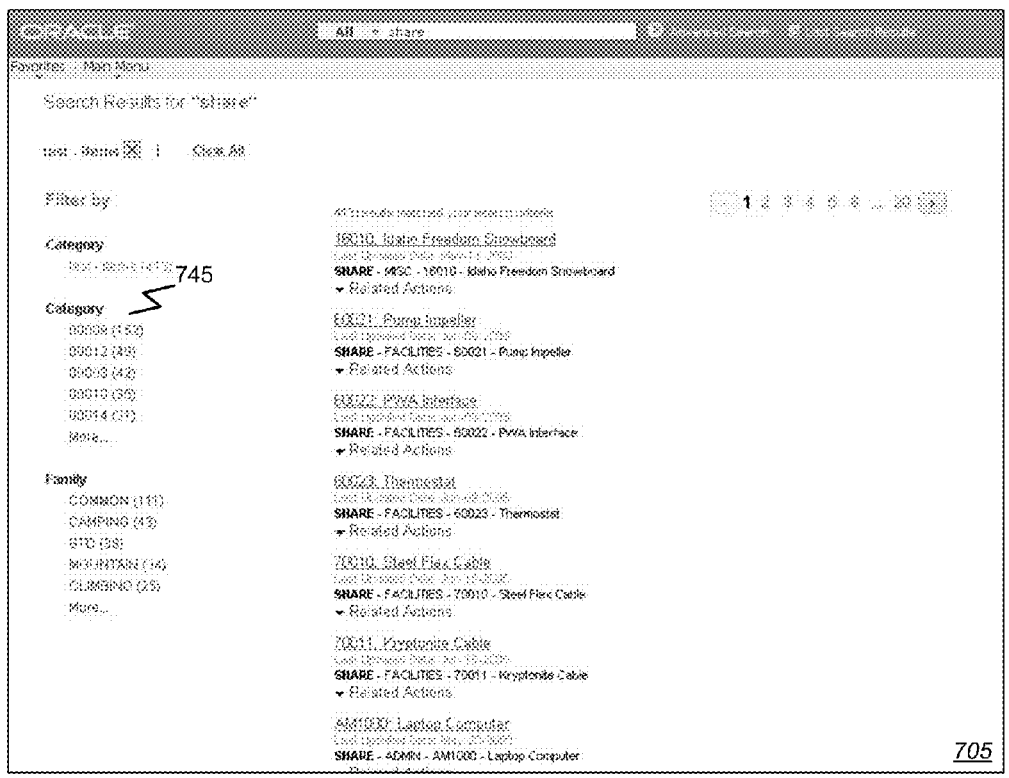

FIGS. 7A-7C are screenshots illustrating exemplary user interfaces for presenting category-based filters according to one embodiment of the present invention. These examples illustrate a page 705 for displaying a list 720 of results. As also shown here, the page can include the search bar 710 and 715 as described above. According to one embodiment, the page 705 can include a set of hyperlinks to one or more filters 725 which can be applied to the list 720 of results. This set of filters 725 can be determined dynamically based on the current context of the page 705 and/or based on the previous selection of the filters. So for example as shown in FIG. 7A, when the user does a search for a keyword across all search categories, the results 720 and list of filters 725 allow for filtering by the Category. However when the user selects a particular value under the Category filter (for example "test-customers"), additional filters can be made available (relevant to "test-customers") as shown in the lists of filters 735 shown in FIG. 7B. Similarly, as shown in FIG. 7C, if the user had selected another category from FIG. 7A (such as "test-items"), then the filtered results show another list of filters 745. This further helps the user to navigate to transactions quickly by providing more filter options contingent upon prior selections, i.e., based on the context.

Figure 8:
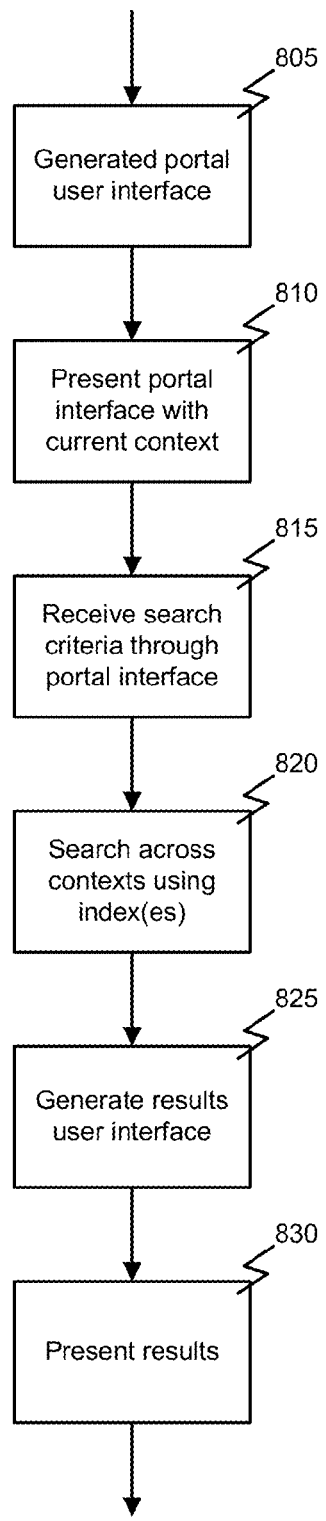
FIG. 8 is a flowchart illustrating a process for providing search-based navigation across different contexts according to one embodiment of the present invention.

FIG. 8 is a flowchart illustrating a process for providing search-based navigation across different contexts according to one embodiment of the present invention. In this example, navigating and accessing data across a plurality of different contexts can begin with generating 805 a user interface for navigating across the plurality of different contexts based on a search of the index. As described above, for example with reference to FIG. 4, the user interface can comprise a view of a current context of the plurality of different contexts and a search element for receiving a set of user defined search criteria for the search. The user interface can be presented 810 to a user. As also described above, for example with reference to FIGS. 6A and 6B, the search element can include a list of categories for selecting a context of the plurality of context for conducting the search. In some cases, the list of categories can be determined dynamically based on the current context of the user interface.

A set of user defined search criteria can be received 815 through the search element of the user interface. A search 820 can be performed on the sets of data of the plurality of different contexts using the index and based on the user defined search criteria. An updated user interface can be generated 825 for presenting the results of the search. The updated user interface can comprise a representation of the results of the search and the search element. According to one embodiment, such as described above with reference to FIG. 5, the updated user interface can also include a list of related actions for each result. As illustrated and described in that example, the related actions for a result can be presented in a hover layer upon selection of that result. Such related actions for a result can be determined dynamically based on the result, a role of the user, a set of permissions for the user, etc. According to one embodiment, such as described above with reference to FIGS. 7A-7C, the updated user interface can additionally or alternatively, include a set of filters for application to the results. In such cases, the set of filters can be determined dynamically based on the current context.

The updated user interface can be present 830 to the user. That is, the updated user interface with the list of search results can be displayed. Through the updated user interface, the user may take any of a variety of further actions. For example, using the still available search element, the user may initiate another, new search across multiple contexts of the application. In another example, the user can selected, e.g., click, one of the returned results to display a set of related actions one of which can in turn be selected to initiate that action. In yet another example, the user may select a filter presented with the returned search results. In such a case, a user selection of one of the filters of the set of filters can be received and applied to the results. In this way, the user can navigate the data, transactions, and/or functions of and/or related to an application such as an enterprise application using a persistently available search element of the user interface without needing to resort to navigating the menus of that application. Additionally, the searches initiated in this way can be applied across the different contexts of the application and/or the data of that application without a need to navigate away from a current context thereof.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for navigating and accessing data across a plurality of different contexts, the method comprising:

executing by a computer system a plurality of different enterprise applications, each enterprise application performing a plurality of different business processes related to business records or transactions;

maintaining by the computer system sets of data related to a plurality of different contexts of the business records or transactions, wherein each set of data is indexed and searchable through the index, and wherein each of the plurality of different contexts relates to one of the business processes of one of the plurality of different enterprise applications;

generating by the computer system a user interface for navigating across the plurality of different contexts based on a search of the index, the user interface comprising a view of a current context of the plurality of different contexts and a search element for receiving a set of user defined search criteria for the search, wherein the current context is defined at least in part by one of the plurality of different enterprise applications;

presenting the user interface by the computer system to a user;

receiving at the computer system a set of user defined search criteria through the search element of the user interface;

searching by the computer system the sets of data of the plurality of different contexts using the index and based on the user defined search criteria, wherein results of the searching comprise data from two or more of the different contexts;

generating by the computer system an updated user interface for presenting the results of the searching, the updated user interface comprising a representation of the results of the searching, the search element and a list of related actions for each result, wherein the related actions for a result are determined dynamically based on the result, a role of the user and a set of permissions for the user; and presenting the updated user interface by the computer system to the user.

2. The method of claim 1, wherein the search element includes a list of categories for selecting a context of the plurality of different context for conducting the search.

3. The method of claim 2, wherein the list of categories is determined dynamically based on the current context of the user interface.

4. The method of claim 1, wherein the related actions for a selected result are presented in a hover layer upon selection of the selected result.

5. The method of claim 1, wherein the updated user interface includes a set of filters for application to the results.

6. The method of claim 5, wherein the set of filters are determined dynamically based on the current context.

7. The method of claim 6, further comprising:
receiving a user selection of one of the filters of the set of filters; and
applying the selected filter to the results.

8. A system comprising:
a processor; and
a memory communicatively coupled with and readable by the processor and having stored thereon a sequence of instructions which, when executed by the processor, cause the processor to:
execute a plurality of different enterprise applications, each enterprise application performing a plurality of different business processes related to business records or transactions,
maintain sets of data related to a plurality of different contexts of the business records or transactions, wherein each set of data is indexed and searchable through the index, and wherein each of the plurality of different contexts relates to one of the business processes of the plurality of different enterprise applications,
generate a user interface for navigating across the plurality of different contexts based on a search of the index, the user interface comprising a view of a current context of the plurality of different contexts and a search element for receiving a set of user defined search criteria for the search, wherein the current context is defined at least in part by one of the plurality of different enterprise applications, present the user interface to a user, receive a set of user defined search criteria through the search element of the user interface, search the sets of data of the plurality of different contexts using the index and based on the user defined search criteria, wherein results of the searching comprise data from two or more of the different contexts, generate an updated user interface for presenting the results of the searching, the updated user interface comprising a representation of the results of the searching, the search element and a list of related actions for each result, wherein the related actions for a result are determined dynamically based on the result, a role of the user and a set of permissions for the user, and present the updated user interface to the user.

9. The system of claim 8, wherein the search element includes a list of categories for selecting a context of the plurality of different context for conducting the search and wherein the list of categories is determined dynamically based on the current context of the user interface.

10. The system of claim 8, wherein the updated user interface includes a set of filters for application to the results and wherein the set of filters are determined dynamically based on the current context.

11. The system of claim 10, further comprising:
receiving a user selection of one of the filters of the set of filters; and
applying the selected filter to the results.

12. A non-transitory computer-readable memory device comprising a set of instructions stored therein which, when executed by a processor, cause the processor to provide a user interface for navigating and accessing data across a plurality of different contexts by:
executing by a computer system a plurality of different enterprise applications, each enterprise application performing a plurality of different business processes related to business records or transactions;
maintaining by the computer system sets of data related to a plurality of different contexts of the business records or transaction, wherein each set of data is indexed and searchable through the index, and wherein each of the plurality of different contexts relates to one of the business processes of one of the plurality of different enterprise applications;
generating by the computer system a user interface for navigating across the plurality of different contexts based on a search of the index, the user interface comprising a view of a current context of the plurality of different contexts and a search element for receiving a set of user defined search criteria for the search, wherein the current context is defined at least in part by one of the plurality of different enterprise applications;
presenting the user interface by the computer system to a user;
receiving at the computer system a set of user defined search criteria through the search element of the user interface;
searching by the computer system the sets of data of the plurality of different contexts using the index and based on the user defined search criteria, wherein results of the searching comprise data from two or more of the different contexts;

generating by the computer system an updated user interface for presenting the results of the searching, the updated user interface comprising a representation of the results of the searching, the search element and a list of related actions for each result, wherein the related actions for a result are determined dynamically based on the result, a role of the user and a set of permissions for the user; and presenting the updated user interface by the computer system to the user.

13. The computer-readable memory device of claim 12, wherein the search element includes a list of categories for selecting a context of the plurality of different context for conducting the search and wherein the list of categories is determined dynamically based on the current context of the user interface.

14. The computer-readable memory device of claim 13, wherein the updated user interface includes a set of filters for application to the results, wherein the set of filters are determined dynamically based on the current context, and wherein navigating and accessing the data across the plurality of different contexts further comprises receiving a user selection of one of the filters of the set of filters and applying the selected filter to the results.

* * * * *